United States Patent
Ma et al.

(10) Patent No.: US 11,233,926 B2
(45) Date of Patent: Jan. 25, 2022

(54) MOBILE TERMINAL AND MANUFACTURING METHOD OF THE SAME

(71) Applicant: VIVO MOBILE COMMUNICATION CO., LTD., Chang'an DongGuan (CN)

(72) Inventors: Zhiting Ma, Chang'an DongGuan (CN); Zhengjun Luo, Chang'an DongGuan (CN); Chuanbo Cheng, Chang'an DongGuan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 447 days.

(21) Appl. No.: 16/320,827

(22) PCT Filed: Jul. 18, 2017

(86) PCT No.: PCT/CN2017/093410
§ 371 (c)(1),
(2) Date: Jan. 25, 2019

(87) PCT Pub. No.: WO2018/019159
PCT Pub. Date: Feb. 1, 2018

(65) Prior Publication Data
US 2019/0174037 A1    Jun. 6, 2019

(30) Foreign Application Priority Data
Jul. 25, 2016    (CN) .......................... 201610592578.X

(51) Int. Cl.
*H04N 5/225*    (2006.01)
*G06K 9/00*    (2006.01)

(52) U.S. Cl.
CPC ............. *H04N 5/2254* (2013.01); *G06K 9/00* (2013.01); *H04N 5/2257* (2013.01)

(58) Field of Classification Search
None
See application file for complete search history.

(56) References Cited

U.S. PATENT DOCUMENTS

| | | |
|---|---|---|
| 2014/0267760 A1 | 9/2014 | Lee et al. |
| 2018/0267390 A1* | 9/2018 | Kim ....................... G03B 17/55 |

(Continued)

FOREIGN PATENT DOCUMENTS

| | | |
|---|---|---|
| CN | 102857680 A | 1/2013 |
| CN | 203340137 U | 12/2013 |

(Continued)

OTHER PUBLICATIONS

EP 17833462.9, Extended European Search Report, dated Feb. 14, 2020, 7 pages.

(Continued)

*Primary Examiner* — William B Perkey
(74) *Attorney, Agent, or Firm* — Getech Law LLC; Jun Ye

(57) ABSTRACT

A mobile terminal and a manufacturing method thereof are provided. The method includes setting an infrared photosensitive assembly on a camera Board-to-Board connector assembly; and connecting a main circuit board of the mobile terminal with the camera Board-to-Board connector assembly set with the infrared photosensitive assembly, so that the infrared photosensitive assembly is electrically connected with the main circuit board through the camera Board-to-Board connector assembly.

8 Claims, 6 Drawing Sheets

(56) References Cited

U.S. PATENT DOCUMENTS

2019/0012544 A1\* 1/2019 Park ................. G06K 9/209
2021/0029275 A1\* 1/2021 Choi ................. G06F 1/1686

FOREIGN PATENT DOCUMENTS

| | | |
|---|---|---|
| CN | 204334759 U | 5/2015 |
| CN | 104717325 A | 6/2015 |
| CN | 204795153 U | 11/2015 |
| CN | 105282283 A | 1/2016 |
| CN | 205068435 U | 3/2016 |
| CN | 105635534 A | 6/2016 |
| CN | 106161894 A | 11/2016 |
| EP | 2675140 A1 | 12/2013 |
| JP | 2014142851 A | 8/2014 |
| KR | 20050031154 A | 4/2005 |
| KR | 20140120770 A | 10/2014 |

OTHER PUBLICATIONS

PCT/CN2017/093410—Translated Written Opinion and ISR dated Oct. 24, 2017, 4 pages Original WO/ISR in Chinese, 11 pages.
PIUS1820604CN—Search Report, dated Jun. 6, 2017, 3 pages. Original in Chinese, 6 pages.
201610592578.X—First Office Action, dated Jul. 20, 2018, 12 pages. Original in Chinese, 8 pages.

\* cited by examiner adhering a second side surface of the first portion of the flexible circuit board included in the infrared photosensitive assembly to a first side surface of the reinforcement plate included in the infrared photosensitive assembly, and setting the infrared photosensitive device included in the infrared photosensitive assembly on a first side surface of the first portion of the flexible circuit board by using the SMT technology. — 81

↓ connecting a first side surface of the second portion of the flexible circuit board with the camera BTB connector PCB included in the camera BTB connector assembly through a pressing process — 82

↓ bending the third portion of the flexible circuit board along a bending central line of the third portion of the flexible circuit board, so that the second side surface of the second portion of the flexible circuit board is adhered to a second side surface of the reinforcement plate — 83

↓ connecting the main circuit board of the mobile terminal with the camera BTB connector assembly set with the infrared photosensitive assembly — 84

Fig.7

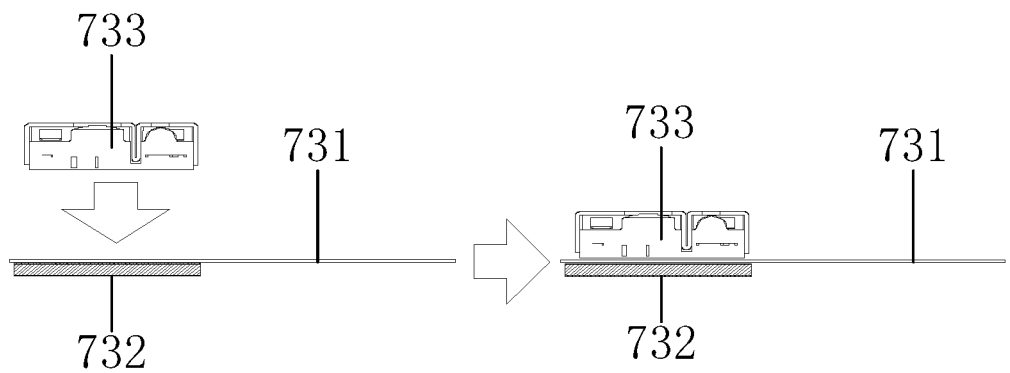

Fig.8

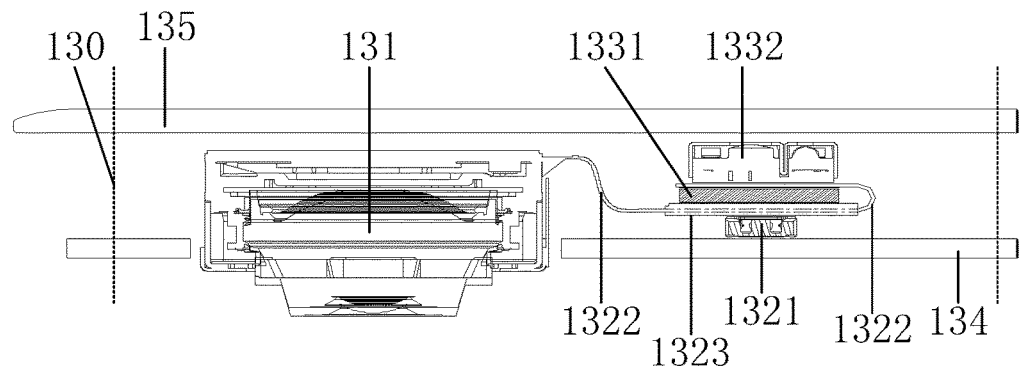

Fig.12 adhering a first side surface of the reinforcement plate included in the infrared photosensitive assembly to a second side surface of the second portion of the camera BTB connector FCB, and setting the infrared photosensitive device included in the infrared photosensitive assembly on a first side surface of the second portion of the camera BTB connector FCB by using the SMT technology — 141 bending the third portion of the camera BTB connector FCB along a bending central line of the third portion of the camera BTB connector FCB, so that a second side surface of the reinforcement plate is adhered to the camera BTB connector circuit board — 142 connecting the main circuit board of the mobile terminal with the camera BTB connector assembly set with the infrared photosensitive assembly — 143

Fig.13

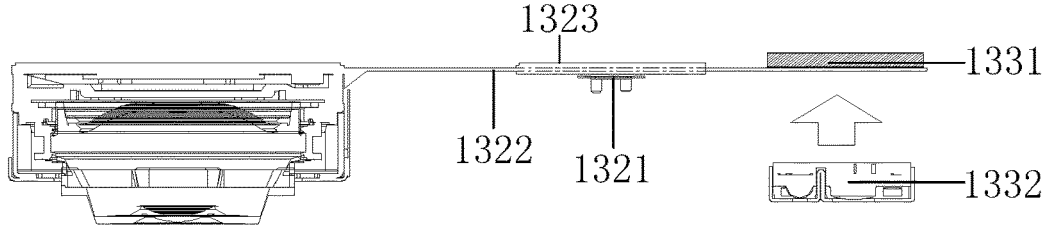

Fig.14

MOBILE TERMINAL AND MANUFACTURING METHOD OF THE SAME

CROSS-REFERENCE TO RELATED APPLICATION

The present application is a U.S. national phase application of a PCT Application No. PCT/CN2017/093410 filed on Jul. 18, 2017, which claims a priority of a Chinese patent application No. 201610592578.X filed in China on Jul. 25, 2016, a disclosure of which is incorporated herein by reference in its entirety.

TECHNICAL FIELD

The present disclosure relates to a field of communication technology, and in particularly, relates to a mobile terminal and a manufacturing method of the mobile terminal.

BACKGROUND

A 3C-type electronic mobile terminal such as a cellular phone or a flat-panel display is generally provided with two devices as follow:

1) a camera for satisfying a photographing requirement of a consumer.

2) an infrared photosensitive device for identifying a distance between a human face and a screen. When the distance between the human face and the screen is short, the screen may be turned off so as to prevent misoperation of the screen; when the distance is long, operation of the screen is allowed.

In actual application, the infrared photosensitive device may also sense a light intensity of environment in which the mobile terminal is located, and transmit a signal related to the light intensity to a Central Processing Unit (CPU) of the mobile terminal. The processor controls a brightness value of the screen so that the light intensity is in direct proportion to the brightness value of the screen.

The camera may be connected with a main circuit board of the mobile terminal through a Board-to-Board (BTB) connector. The infrared photosensitive device may be connected with the main circuit board through surface mounting technology or BTB connection technology. Due to a limited space resource of the main circuit board, how to appropriately set the camera, the infrared photosensitive device, the BTB connector and other elements so as to improve a spatial utilization rate for the limited space resource of the main circuit board becomes a problem interested by one skilled in the art.

SUMMARY

A mobile terminal is provided in some embodiments of the present disclosure, and includes a camera assembly, a camera Board-to-Board connector assembly, an infrared photosensitive assembly and a main circuit board, wherein the infrared photosensitive assembly is set on the camera Board-to-Board connector assembly and is electrically connected with the main circuit board through the camera Board-to-Board connector assembly.

A method for manufacturing a mobile terminal is further provided in some embodiments of the present disclosure, and includes setting an infrared photosensitive assembly on a camera Board-to-Board connector assembly; and connecting a main circuit board of the mobile terminal with the camera Board-to-Board connector assembly set with the infrared photosensitive assembly, so that the infrared photosensitive assembly is electrically connected with the main circuit board through the camera Board-to-Board connector assembly.

BRIEF DESCRIPTION OF THE DRAWINGS

In order to illustrate technical solutions of embodiments of the present disclosure more clearly, drawings used in description of the embodiments will be introduced hereinafter briefly. Obviously, the following drawings merely relate to some embodiments of the present disclosure, and based on these drawings, a person skilled in the art may obtain other drawings without any creative effort.

FIG. 7 is still another flowchart of the method for manufacturing the mobile terminal provided in some embodiments of the present disclosure;

FIG. 8 is another schematic view of the implementation process of the method for manufacturing the mobile terminal provided in some embodiments of the present disclosure;

FIG. 12 is yet another structural schematic view of the mobile terminal provided in some embodiments of the present disclosure;

FIG. 13 is yet another flowchart of the method for manufacturing the mobile terminal provided in some embodiments of the present disclosure;

FIG. 14 is still yet another schematic view of the implementation process of the method for manufacturing the mobile terminal provided in some embodiments of the present disclosure;

DETAILED DESCRIPTION

In order to make technical solutions and advantages of the embodiments of the present disclosure, the technical solutions of the embodiments of the present disclosure will be described hereinafter clearly and completely in combination with the drawings of the embodiments of the present disclosure. Obviously, the described embodiments of the present disclosure are a part, not all, of the embodiments of the present disclosure. All other embodiments obtained by one skilled in the art based the described embodiments of the present disclosure fall within the scope of the present disclosure.

Unless otherwise defined, any technical or scientific term used herein shall have a common meaning understood by a person of ordinary skills in the art to which the present disclosure belongs. Such words as "first", "second", or the like used in the description and claims of the present disclosure are not used to represent any order, number or importance, but merely used to differentiate different components. Similarly, such words as "one element" or "one of the elements" are not intended to limit the quantity of the element, but represent existence of at least one element. Such words as "connect/connected with" or "couple/coupled to" are not intended to be limited to physical connections or mechanical connections, but may include an electrical connection, whether the connection is a direct connection or an indirect direction. Such words as "above", "under", "left" and "right" are merely used to represent relative position relationship, and when an absolute position of a described object is changed, the relative position relationship is also changed.

A mobile terminal and a manufacturing method of the mobile terminal are provided in the present disclosure so as to solve a problem in a related mobile terminal that arrangement of devices in the mobile terminal occupies a large footprint on the main circuit board, and a limited space resource on the main circuit board is wasted.

Figure 1:
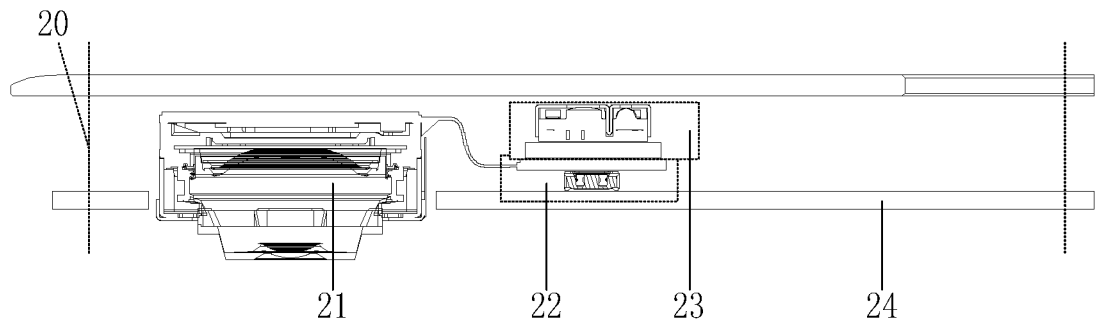
FIG. 1 is a structural schematic view of a mobile terminal provided in some embodiments of the present disclosure.

Some embodiments of the present disclosure provide a mobile terminal 20. As shown in FIG. 1, the mobile terminal 20 includes a camera assembly 21, a camera Board-to-Board (BTB) connector assembly 22, an infrared photosensitive assembly 23, and a main circuit board 24. The infrared photosensitive assembly 23 is set on the camera BTB connector assembly 22, and is electrically connected with the main circuit board 24 through the camera BTB connector assembly 22.

Since the infrared photosensitive assembly 23 and the camera BTB connector assembly 22 are stacked in the mobile terminal 20 provided in some embodiments of the present disclosure, compact arrangement of internal devices in the mobile terminal 20 is achieved, a spatial utilization of the main circuit board 24 of the mobile terminal 20 is improved, and miniaturization of the mobile terminal 20 may be facilitated.

The camera assembly disclosed in some embodiments of the present disclosure may be a camera assembly, performance of which is mature and reliable.

Figure 2:
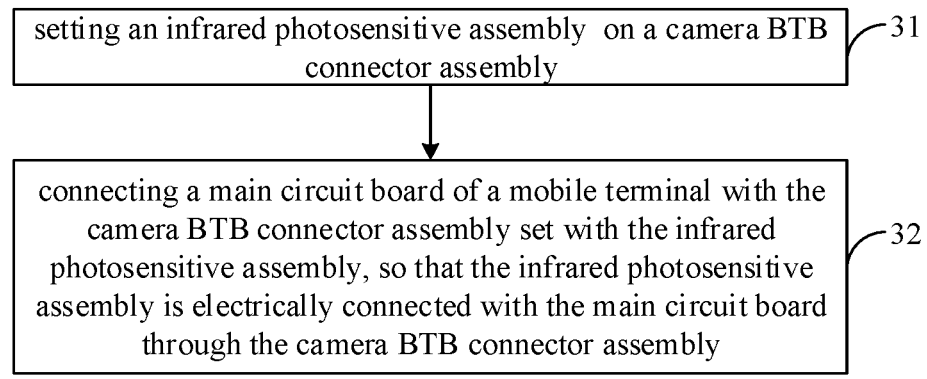
FIG. 2 is a flowchart of a method for manufacturing the mobile terminal provided in some embodiments of the present disclosure.

Some embodiments of the present disclosure further provide a method for manufacturing the mobile terminal 20. As shown in FIG. 2, the method may include Steps 31-32.

Step 31: setting the infrared photosensitive assembly 23 on the camera BTB connector assembly 22.

Step 32: connecting the main circuit board 24 of the mobile terminal 20 with the camera BTB connector assembly 22 provided with the infrared photosensitive assembly 23, so that the infrared photosensitive assembly 23 is electrically connected with the main circuit board 24 through the camera BTB connector assembly 22.

Since the infrared photosensitive assembly 23 and the camera BTB connector assembly 22 are stacked using the method for manufacturing the mobile terminal provided in some embodiments of the present disclosure, the compact arrangement of the internal devices in the mobile terminal 20 is achieved, the spatial utilization of the main circuit board 24 of the mobile terminal 20 is improved, and the miniaturization of the mobile terminal 20 may be facilitated.

Figure 3:
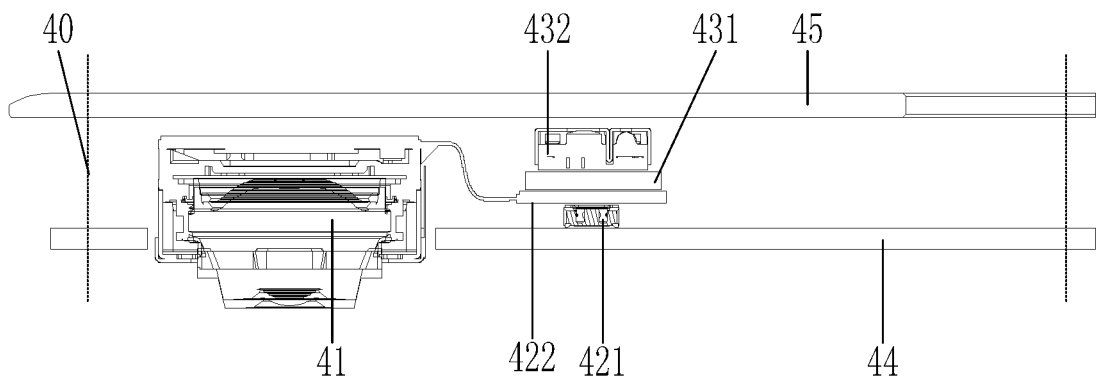
FIG. 3 is another structural schematic view of the mobile terminal provided in some embodiments of the present disclosure.

Some embodiments of the present disclosure provide a mobile terminal 40. As shown in FIG. 3, the mobile terminal 40 may specifically include a camera assembly 41, a camera BTB connector assembly, an infrared photosensitive assembly and a main circuit board 44.

As shown in FIG. 3, the camera BTB connector assembly involved in the present disclosure may specifically include a camera BTB connector 421 set at a predetermined position of the main circuit board 44; and a camera BTB connector Printed Circuit Board (PCB) 422 set on the camera BTB connector 421. The infrared photosensitive assembly is set on the camera BTB connector PCB 422, and the camera BTB connector PCB 422 is electrically connected with the camera assembly 41.

Optionally, the infrared photosensitive assembly may be set on the camera BTB connector PCB 422 through surface mounting technology (SMT), and may be electrically connected with the main circuit board 44 through the camera BTB connector PCB 422 and the camera BTB connector 421.

Optionally, the camera assembly 41 may be electrically connected with the camera BTB connector PCB 422 through a flexible circuit board or a lead.

As shown in FIG. 3, the infrared photosensitive assembly may specifically include: a raised circuit board 431 set on, and electrically connected with, the camera BTB connector PCB 422; and an infrared photosensitive device 432 set on the raised circuit board 431.

In a design for an internal structure of the mobile terminal, a distance between an upper surface of the camera BTB connector PCB 422 and an inner surface of a glass cover plate 45 is generally long, and a height (or thickness) of the infrared photosensitive device 432 is relatively small. However, for purpose of normal operation of the infrared photosensitive device 432, a short distance between the infrared photosensitive device 432 and the glass cover plate 45 should be small. Therefore, the raised circuit board 431 having a certain height (or thickness) may be provided at a bottom of the infrared photosensitive device 432 in the present disclosure. In this way, not only the infrared photosensitive device 432 may be electrically connected with the camera BTB connector PCB 422, but also the distance between the infrared photosensitive device 432 and the glass cover plate 45 may be shortened in accordance with an entire inner spatial environment of the mobile terminal 40, so as to achieve the normal operation of the infrared photosensitive device 432.

A corresponding type of the infrared photosensitive device 432 involved in some embodiments of the present disclosure may be selected in accordance with practical needs.

Since the infrared photosensitive assembly and the camera BTB connector assembly stacked in the mobile terminal 40 provided in some embodiments of the present disclosure, the compact arrangement of the internal devices in the mobile terminal 40 is achieved, the spatial utilization of the main circuit board of the mobile terminal 40 is improved, and the miniaturization of the mobile terminal 40 may be facilitated.

Figure 4:
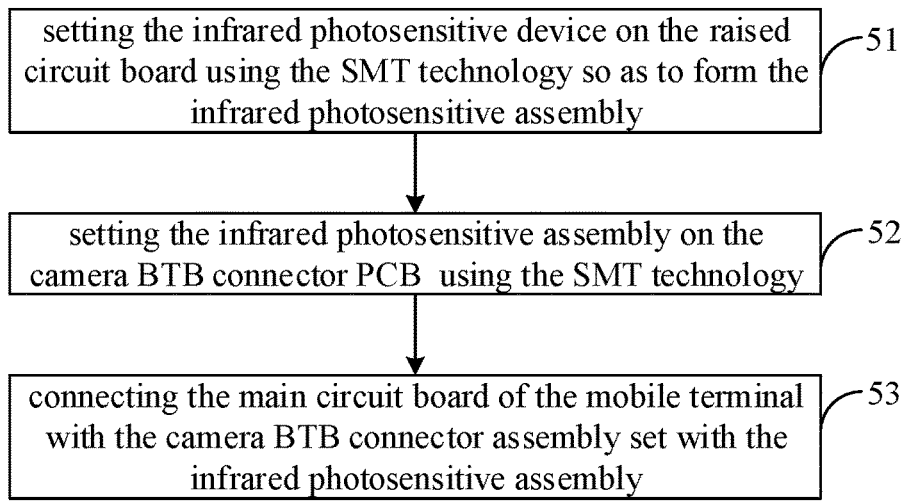
FIG. 4 is another flowchart of the method for manufacturing the mobile terminal provided in some embodiments of the present disclosure.

Some embodiments of the present disclosure further provide a method for manufacturing the mobile terminal 40 shown in FIG. 3. As shown in FIG. 4, the method may include steps 51-53.

Step 51: setting the infrared photosensitive device 432 on the raised circuit board 431 using the SMT technology so as to form the infrared photosensitive assembly.

Step 52: setting the infrared photosensitive assembly on the camera BTB connector PCB 422 using the SMT technology.

Figure 5:
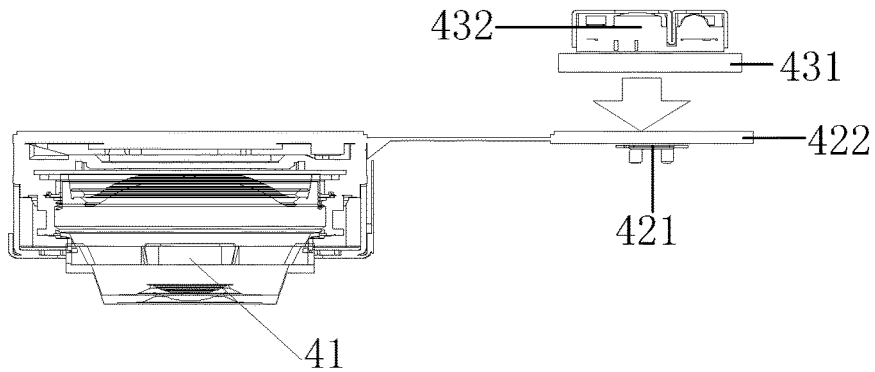
FIG. 5 is a schematic view of a implementation process of the method for manufacturing the mobile terminal provided in some embodiments of the present disclosure.

FIG. 5 shows an implementation process of the method for manufacturing the mobile terminal.

Step 53: connecting the main circuit board 44 of the mobile terminal 40 with the camera BTB connector assembly set with the infrared photosensitive assembly, during an assembly process for producing of the mobile terminal. For example, the camera BTB connector assembly set with the infrared photosensitive assembly may be connected with the main circuit board 44 in a buckling manner, so that the infrared photosensitive assembly may be electrically connected with the main circuit board 44 through the camera BTB connector assembly, and relevant control functions may be achieved.

Since the infrared photosensitive assembly and the camera BTB connector assembly are stacked using the method for manufacturing the mobile terminal provided in some embodiments of the present disclosure, the compact arrangement of the internal devices in the mobile terminal 40 is achieved, the spatial utilization of the main circuit board 44 of the mobile terminal 40 is improved, and the miniaturization of the mobile terminal 40 may be facilitated.

Figure 6:
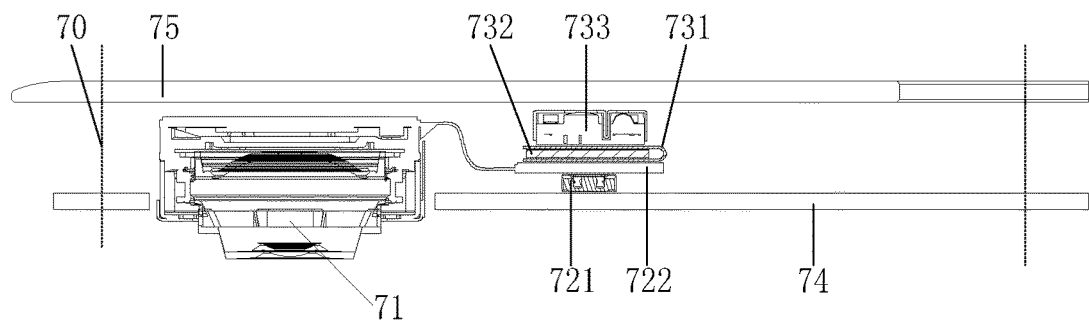
FIG. 6 is still another structural schematic view of the mobile terminal provided in some embodiments of the present disclosure.

Some embodiments of the present disclosure further provide a mobile terminal 70. As shown in FIG. 6, the mobile terminal 70 may specifically include a camera assembly 71, a camera BTB connector assembly, an infrared photosensitive assembly and a main circuit board 74.

As shown in FIG. 6, the camera BTB connector assembly involved in the present disclosure may include: a camera BTB connector 721 set at a predetermined position of the main circuit board 74; and a camera BTB connector PCB 722 set on the camera BTB connector 721. The infrared photosensitive assembly is set on the camera BTB connector PCB 722, and the camera assembly 71 is electrically connected with the camera BTB connector PCB 722.

As shown in FIG. 6, the infrared photosensitive assembly may specifically include a flexible circuit board 731, a reinforcement plate 732 and an infrared photosensitive device 733.

Optionally, the flexible circuit board 731 may specifically include a first portion for connecting to the camera BTB connector PCB 722, a second portion for setting the infrared photosensitive device 733, and a third portion for connecting the first portion with the second portion. The first portion is set on the camera BTB connector PCB 722. The reinforcement plate 732 is set on the first portion. The second portion is set on the reinforcement plate 732. The infrared photosensitive device 733 is set on the second portion. The third portion is set at a side of the reinforcement plate 732 in a horizontal direction.

Optionally, the flexible circuit board 731 may be connected with the reinforcement plate 732 through an adhesive. The adhesive may achieve two purposes. One of the purposes is to improve a yield of the infrared photosensitive device 733 during a SMT process by adhering the reinforcement plate; and the other of the purposes is to raise the infrared photosensitive device 733 properly so that the distance between the infrared photosensitive device 733 and the glass cover plate 75 is appropriate.

Since the infrared photosensitive assembly and the camera BTB connector assembly are stacked in the mobile terminal 70 provided in some embodiments of the present disclosure, the compact arrangement of the internal devices in the mobile terminal 70 is achieved, the spatial utilization of the main circuit board 74 of the mobile terminal 70 is improved, and the miniaturization of the mobile terminal 70 may be facilitated.

Some embodiments of the present disclosure provide a method for manufacturing the mobile terminal 70 shown in FIG. 6. As shown in FIG. 7, the method may specifically include steps 81-84.

Step 81: adhering a second side surface of the first portion of the flexible circuit board 731 included in the infrared photosensitive assembly to a first side surface of the reinforcement plate 732 included in the infrared photosensitive assembly, and setting the infrared photosensitive device 733 included in the infrared photosensitive assembly on a first side surface of the first portion of the flexible circuit board 731 by using the SMT technology. The first side surface of the first portion of the flexible circuit board 731 is a back surface opposite to the second side surface of the first portion of the flexible circuit board 731.

FIG. 8 shows a schematic diagram of the implementation process of this step.

Step 82: connecting a first side surface of the second portion of the flexible circuit board 731 with the camera BTB connector PCB 722 included in the camera BTB connector assembly through an ACF pressing process. The first side surface of the second portion of the flexible circuit board 731 and the first side surface of the first portion of the flexible circuit board 731 are a same side surface of the flexible circuit board 731.

Figure 9:
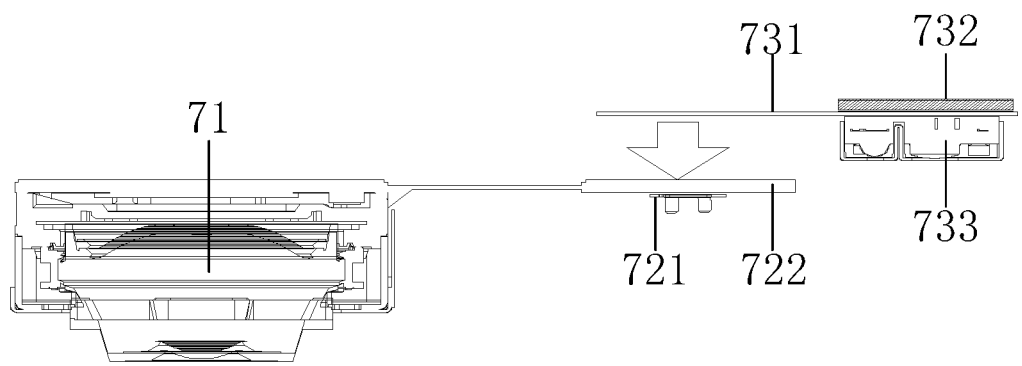
FIG. 9 is still another schematic view of the implementation process of the method for manufacturing the mobile terminal provided in some embodiments of the present disclosure.

FIG. 9 shows a schematic diagram of the implementation process of this step.

Figure 10:
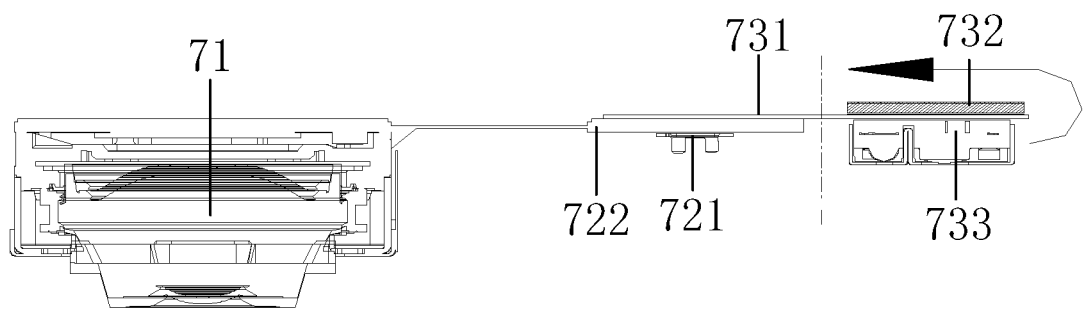
FIG. 10 is yet another schematic view of the implementation process of the method for manufacturing the mobile terminal provided in some embodiments of the present disclosure.

Step 83: bending the third portion of the flexible circuit board 731 along a bending central line of the third portion of the flexible circuit board 731 (indicated by a dotted line in FIG. 10), so that the second side surface of the second portion of the flexible circuit board 731 is adhered to a second side surface of the reinforcement plate 732. The second side surface of the second portion of the flexible circuit board 731 is a back surface opposite to the first side surface of the second portion of the flexible circuit board 731, and the second side surface of the reinforcement plate 732 is a back surface opposite to the first side surface of the reinforcement plate 732.

Figure 11:
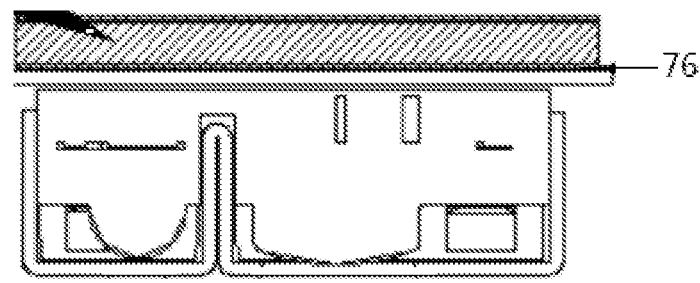
FIG. 11 is still yet another schematic view of the implementation process of the method for manufacturing the mobile terminal provided in some embodiments of the present disclosure.

The "adhering" involved in the present disclosure is shown in FIG. 11, and may be implemented through applying a double-sided adhesive 76 at a position where two devices are in contact with each other.

Step 84: connecting the main circuit board 74 of the mobile terminal 70 with the camera BTB connector assembly set with the infrared photosensitive assembly. For example, the camera BTB connector assembly set with the infrared photosensitive assembly may be connected with the main circuit board 74 in the buckling manner, so that the infrared photosensitive assembly is electrically connected with the main circuit board 74 through the camera BTB connector assembly, and the relevant control functions may be achieved.

Since the infrared photosensitive assembly on the camera BTB connector assembly are stacked using the method for manufacturing the mobile terminal provided in some embodiments of the present disclosure, the compact arrangement of the internal devices in the mobile terminal 70 is achieved, the spatial utilization of the main circuit board 74 of the mobile terminal 70 is improved, and the miniaturization of the mobile terminal 70 may be facilitated.

Some embodiments of the present disclosure provide a mobile terminal 130. As shown in FIG. 12, the mobile terminal 130 may specifically include a camera assembly 131, a camera BTB connector assembly, an infrared photosensitive assembly and a main circuit board 134.

As shown in FIG. 12, the camera BTB connector assembly involved in the present disclosure may specifically include: a camera BTB connector 1321 set at a predetermined position of the main circuit board 134; a camera BTB connector flexible circuit board (FCB) 1322 set on the camera BTB connector 1321, wherein the camera BTB connector FCB 1322 may specifically include a first portion for connecting to the camera BTB connector 1321, a second portion for setting the infrared photosensitive assembly, and a third portion connecting the first portion with the second portion, and a fourth portion for connecting to the camera assembly 131; and a camera BTB connector circuit board 1323 set on the first portion of the camera BTB connector FCB 1322.

As shown in FIG. 12, the infrared photosensitive assembly may specifically include a reinforcement plate 1331 and an infrared photosensitive device 1332. The reinforcement plate 1331 is set on the camera BTB connector circuit board 1323, and the second portion of the camera BTB connector FCB 1322 is set on the reinforcement plate 1331. The infrared photosensitive device 1332 is set on the second portion of the camera BTB connector FCB 1322.

Since the infrared photosensitive assembly and the camera BTB connector assembly are stacked in the mobile terminal 130 provided in some embodiments of the present disclosure, the compact arrangement of the internal devices in the mobile terminal 130 is achieved, the spatial utilization of the main circuit board 134 of the mobile terminal 130 is improved, and miniaturization of the mobile terminal 130 may be facilitated.

Some embodiments of the present disclosure provide a method for manufacturing the mobile terminal 130 shown in FIG. 12. As shown in FIG. 13, the method may include steps 141-143.

Step 141: adhering a first side surface of the reinforcement plate 1331 included in the infrared photosensitive assembly to a second side surface of the second portion of the camera BTB connector FCB 1322, and setting the infrared photosensitive device 1332 included in the infrared photosensitive assembly on a first side surface of the second portion of the camera BTB connector FCB 1322 by using the SMT technology. The first side surface of the second portion of the camera BTB connector FCB 1322 is a back surface opposite to the second side surface of the second portion of the camera BTB connector FCB 1322.

FIG. 14 shows a schematic diagram of the implementation process of this step.

Step 142: bending the third portion of the camera BTB connector FCB 1322 along a bending central line of the third portion of the camera BTB connector FCB 1322, so that a second side surface of the reinforcement plate 1331 is adhered to the camera BTB connector circuit board 1323. The second side surface of the reinforcement plate 1331 is a back surface opposite to the first side surface of the reinforcement plate 1331.

Figure 15:
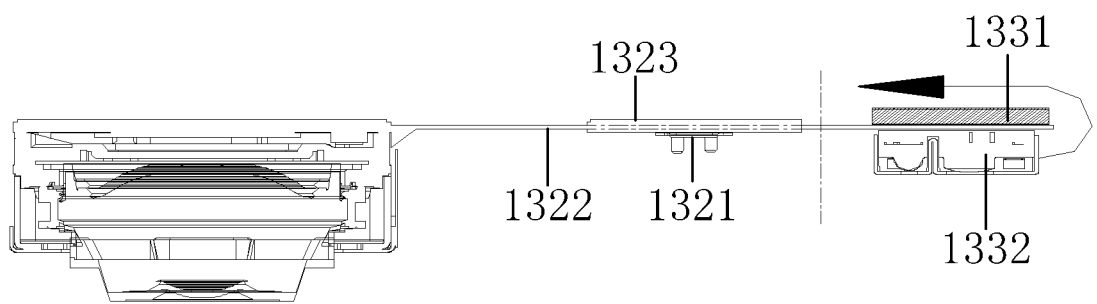
FIG. 15 is still yet another schematic view of the implementation process of the method for manufacturing the mobile terminal provided in some embodiments of the present disclosure.

FIG. 15 shows a schematic diagram of the implementation process of this step.

Step 143: connecting the main circuit board 134 of the mobile terminal 130 with the camera BTB connector assembly 132 set with the infrared photosensitive assembly 133. For example, the camera BTB connector assembly 132 set with the infrared photosensitive assembly 133 may be connected with the main circuit board 134 in the buckling manner, so that the infrared photosensitive assembly 133 may be electrically connected with the main circuit board 134 through the camera BTB connector assembly 132, and the relevant control functions are achieved.

Since the infrared photosensitive assembly 133 and the camera BTB connector assembly 132 are stacked using the method for manufacturing the mobile terminal provided in some embodiments of the present disclosure, the compact arrangement of the internal devices in the mobile terminal 130 is achieved, the spatial utilization of the main circuit board 134 of the mobile terminal 130 is improved, and the miniaturization of the mobile terminal 130 may be facilitated.

It may be seen from the above that, in the mobile terminal and the method for manufacturing the mobile terminal provided in some embodiments of the present disclosure, an infrared photosensitive assembly is set on a camera Board-to-Board connector assembly; and a main circuit board of the mobile terminal is connected with the camera Board-to-Board connector assembly set with the infrared photosensitive assembly, so that the infrared photosensitive assembly is electrically connected with the main circuit board through the camera Board-to-Board connector assembly. Thus, footprints occupied by internal devices in the mobile terminal are reduced by stacking the internal devices, and the limited space resource on the main circuit board in the mobile terminal is saved, and miniaturization of the mobile terminal may be facilitated.

It may be seen from the above that, in the mobile terminal and the method for manufacturing the mobile terminal provided in some embodiments of the present disclosure, an infrared photosensitive assembly is set on a camera Board-to-Board connector assembly; and a main circuit board of the mobile terminal is connected with the camera Board-to-Board connector assembly set with the infrared photosensitive assembly, so that the infrared photosensitive assembly is electrically connected with the main circuit board through the camera Board-to-Board connector assembly. Thus, footprints occupied by internal devices in the mobile terminal are reduced by stacking the internal devices, and the limited space resource on the main circuit board in the mobile terminal is saved, and miniaturization of the mobile terminal may be facilitated.

The above embodiments are optional embodiments of the present disclosure. One skilled in the art may make various modifications and substitutions without departing from the spirit of the present disclosure, and these modifications and substitutions shall also fall within the scope of the present disclosure.

What is claimed is:
1. A mobile terminal, comprising:
  a camera assembly, a camera Board-to-Board connector assembly, an infrared photosensitive assembly and a main circuit board,
  wherein the infrared photosensitive assembly is set on the camera Board-to-Board connector assembly, and is electrically connected with the main circuit board through the camera Board-to-Board connector assembly;
  wherein the camera BTB connector assembly comprises:

a camera Board-to-Board connector set at a predetermined position of the main circuit board, and a camera Board-to-Board connector circuit board set on the camera Board-to-Board connector, wherein the infrared photosensitive assembly is set on the camera Board-to-Board connector circuit board, and the camera Board-to-Board connector circuit board is electrically connected with the camera assembly;

or, wherein the camera Board-to-Board connector assembly comprises:

a camera Board-to-Board connector set at a predetermined position of the main circuit board;

a camera Board-to-Board connector flexible circuit board set on the camera Board-to-Board connector, wherein the camera Board-to-Board connector flexible circuit board comprises a first portion for connecting to the camera Board-to-Board connector, a second portion for setting the infrared photosensitive assembly, a third portion for connecting the first portion with the second portion, and a fourth portion for connecting to the camera assembly; and a camera Board-to-Board connector circuit board set on the first portion of the camera Board-to-Board connector flexible circuit board.

2. The mobile terminal according to claim 1, wherein, in a case that the camera Board-to-Board connector circuit board is set on the camera Board-to-Board connector, the infrared photosensitive assembly comprises:

a raised circuit board set on the camera Board-to-Board connector circuit board and electrically connected with the camera Board-to-Board connector circuit board;

an infrared photosensitive device set on the raised circuit board.

3. The mobile terminal according to claim 1, wherein, in a case that the camera Board-to-Board connector circuit board is set on the camera Board-to-Board connector, the infrared photosensitive assembly comprises a flexible circuit board, a reinforcement plate and an infrared photosensitive device;

the flexible circuit board comprises a first portion for connecting to the camera Board-to-Board connector circuit board, a second portion for setting the infrared photosensitive device, and a third portion for connecting the first portion with the second portion, wherein the first portion is set on the camera Board-to-Board connector circuit board, the reinforcement plate is set on the first portion, and the second portion is set on the reinforcement plate, the infrared photosensitive device is set on the second portion, and the third portion is set at a side of the reinforcement plate in a horizontal direction.

4. The mobile terminal according to claim 1, wherein, in a case that the camera Board-to-Board connector flexible circuit board is set on the camera Board-to-Board connector, the infrared photosensitive assembly comprises a reinforcement plate and an infrared photosensitive device, wherein the reinforcement plate is set on the camera Board-to-Board connector circuit board, the second portion of the camera Board-to-Board connector flexible circuit board is set on the reinforcement plate; and the infrared photosensitive device is set on the second portion of the camera Board-to-Board connector flexible circuit board.

5. A method for manufacturing a mobile terminal, comprising:

setting an infrared photosensitive assembly on a camera Board-to-Board connector assembly; and connecting a main circuit board of the mobile terminal with the camera Board-to-Board connector assembly set with the infrared photosensitive assembly, so that the infrared photosensitive assembly is electrically connected with the main circuit board through the camera Board-to-Board connector assembly;

wherein the camera BTB connector assembly comprises:

a camera Board-to-Board connector set at a predetermined position of the main circuit board, and a camera Board-to-Board connector circuit board set on the camera Board-to-Board connector, wherein the infrared photosensitive assembly is set on the camera Board-to-Board connector circuit board, and the camera Board-to-Board connector circuit board is electrically connected with the camera assembly;

or, wherein the camera Board-to-Board connector assembly comprises:

a camera Board-to-Board connector set at a predetermined position of the main circuit board;

a camera Board-to-Board connector flexible circuit board set on the camera Board-to-Board connector, wherein the camera Board-to-Board connector flexible circuit board comprises a first portion for connecting to the camera Board-to-Board connector, a second portion for setting the infrared photosensitive assembly, a third portion for connecting the first portion with the second portion, and a fourth portion for connecting to the camera assembly; and a camera Board-to-Board connector circuit board set on the first portion of the camera Board-to-Board connector flexible circuit board.

6. The method according to claim 5, wherein, in a case that the camera Board-to-Board connector circuit board is set on the camera Board-to-Board connector, the setting the infrared photosensitive assembly on the camera Board-to-Board connector assembly comprises:

setting an infrared photosensitive device on a raised circuit board by using Surface Mounting Technology so as to form the infrared photosensitive assembly, and setting the infrared photosensitive assembly on a camera Board-to-Board connector circuit board by using the Surface Mounting Technology.

7. The method according to claim 5, wherein, in a case that the camera Board-to-Board connector flexible circuit board is set on the camera Board-to-Board connector, the setting the infrared photosensitive assembly on the camera Board-to-Board connector assembly comprises:

adhering a second side surface of a first portion of a flexible circuit board comprised in the infrared photosensitive assembly to a first side surface of a reinforcement plate comprised in the infrared photosensitive assembly, and setting an infrared photosensitive device comprised in the infrared photosensitive assembly on a first side surface of the first portion of the flexible circuit by using Surface Mounting Technology, wherein the first side surface of the first portion of the flexible circuit board is a back surface opposite to the second side surface of the first portion of the flexible circuit board;

connecting a first side surface of a second portion of the flexible circuit board with a camera Board-to-Board connector circuit board comprised in the camera Board-to-Board connector assembly in a buckling manner, wherein the first side surface of the second portion of the flexible circuit board and the first side surface of the first portion of the flexible circuit board are a same side surface of the flexible circuit board; and bending a third portion of the flexible circuit board along a bending central line of the third portion of the flexible circuit board, so that a second side surface of the second portion of the flexible circuit board is adhered to a second side surface of the reinforcement plate, wherein the second side surface of the second portion of the flexible circuit board is a back surface opposite to the first side surface of the second portion of the flexible circuit board, and the second side surface of the reinforcement plate is a back surface opposite to the first side surface of the reinforcement plate.

8. The method according to claim 5, wherein, in a case that the camera Board-to-Board connector flexible circuit board is set on the camera Board-to-Board connector, the setting the infrared photosensitive assembly on the camera Board-to-Board connector assembly comprises:

adhering a first side surface of a reinforcement plate comprised in the infrared photosensitive assembly to a second side surface of a second portion of a camera Board-to-Board connector flexible circuit board, and setting an infrared photosensitive device comprised in the infrared photosensitive assembly on a first side surface of the second portion of the camera Board-to-Board connector flexible circuit board by using the Surface Mounting Technology, wherein the first side surface of the second portion of the camera Board-to-Board connector flexible circuit board is a back surface opposite to the second side surface of the second portion of the camera Board-to-Board connector flexible circuit board; and bending a third portion of the camera Board-to-Board connector flexible circuit board along a bending central line of the third portion of the camera Board-to-Board connector flexible circuit board, so that a second side surface of the reinforcement plate is adhered to a camera Board-to-Board connector circuit board, wherein the second side surface of the reinforcement plate is a back surface opposite to the first side surface of the reinforcement plate.

\* \* \* \* \*